United States Patent [19]

Morland et al.

[11] Patent Number: 5,114,629
[45] Date of Patent: May 19, 1992

[54] PROCESS FOR CASTING LENSES

[75] Inventors: Albert H. Morland, Hampshire; Timothy J. Warren, Southampton, both of England

[73] Assignee: CooperVision, Inc., Palo Alto, Calif.

[21] Appl. No.: 527,867

[22] Filed: May 24, 1990

Related U.S. Application Data

[60] Division of Ser. No. 119,269, Nov. 9, 1987, Pat. No. 4,944,899, which is a continuation of Ser. No. 840,781, Mar. 18, 1986, abandoned.

[30] Foreign Application Priority Data

Mar. 19, 1985 [GB] United Kingdom ............... 8507007

[51] Int. Cl.$^5$ ............................................ B29D 11/00
[52] U.S. Cl. ..................................... 264/2.2; 264/1.1; 264/2.5; 425/808
[58] Field of Search .................. 261/1.1, 2.2, 2.5; 425/808

[56] References Cited

U.S. PATENT DOCUMENTS

| | | | |
|---|---|---|---|
| 2,332,674 | 10/1943 | Smith | 264/40.2 |
| 3,005,234 | 10/1961 | Oriani et al. | 425/808 |
| 3,423,488 | 1/1969 | Bowser | 264/2.2 |
| 3,894,710 | 7/1975 | Sarofeen | 249/117 |
| 4,113,224 | 9/1978 | Clark et al. | 425/808 |
| 4,121,896 | 10/1978 | Shepherd | 264/2.2 |
| 4,402,659 | 9/1983 | Greenbaum | 264/2.2 |
| 4,440,699 | 4/1984 | Smid et al. | 264/1.4 |
| 4,469,646 | 9/1984 | Rawlings | 264/2.2 |
| 4,540,532 | 9/1985 | Petcen et al. | 264/1.1 |
| 4,565,348 | 1/1986 | Larsen | 425/808 |
| 4,623,496 | 11/1986 | Verhoeven et al. | |

FOREIGN PATENT DOCUMENTS 2040213  8/1980  United Kingdom ................ 264/1.1

Primary Examiner—James Lowe
Attorney, Agent, or Firm—Vorys, Sater Seymour & Pease

[57] ABSTRACT

Disclosed is a process for casting lenses using male and female mould halves, which comprises placing a polymerizable liquid composition into the female mould half, introducing a male mould into the female mould along a substantially vertical axis until the male mould touches the surface of the liquid composition and then allowing the male mould to fall under its own weight into the female mould half and curing or allowing the polymerizable composition to cure. Also included is apparatus suitable for carrying out the casting process which comprises a substantially horizontal support for the female mould, a holder for releasably holding the male mould, means for moving the holder towards and into the female mould along a substantially vertical path passing through the axes of the moulds and means for detecting contact between the male mould and the surface of the liquid composition and causing said holder to release the male mould. Preferably, the moulds are formed from a thermoplastic material and are maintained under a predetermined closing pressure by spot welding the flanges.

10 Claims, 3 Drawing Sheets

PROCESS FOR CASTING LENSES

This is a divisional of application Ser. No. 907/119,269, filed Nov. 9, 1987, which issued as U.S. Pat. No. 4,944,899 on July 31, 1990, which is a continuation of Ser. No. 06/840,781, filed on Mar. 18, 1986 and now abandoned.

FIELD OF THE INVENTION

This invention relates to the manufacture of lenses, especially contact lenses, by a casting procedure.

DESCRIPTION OF RELATED ART

Although casting potentially provides one of the cheapest methods of manufacture of contact lenses, its adoption by manufacturers has been restricted because of difficulties in producing lenses of consistent quality. Typical problems are development of bubbles or voids in the cured polymer of the lenses or surface or edge distortions, all of which lead to rejection of a high proportion of the molded lenses at the inspection stage.

T.H. Shepherd in U.K. patent No. 1,575,694 proposed the use of polypropylene moulds in which the edge of the cast lens is defined by an integral, flexible rim, usually on the male mould half.

According to the process described by Shepherd, lenses are cast by filling a suitable polymerisable liquid composition into the female mould half and pressing the male mould half into the female mould cavity until excess polymerisable liquid is displaced. The filled mould is maintained at a controlled temperature until the composition has polymerised to a clear solid. During polymerisation, a monomer mixture will undergo shrinkage, which depends on the nature of the monomer mixture but has been estimated to lie normally between 10 and 20 volume %. Cast lenses are frequently observed to contain bubbles or voids and Shepherd attributed these to the failure to allow for the shrinkage arising on polymerisation. His flexible rim was therefore intended to deflect inwardly during polymerisation and in this way to compensate for the volume shrinkage. However, formation of bubbles and voids has not been eliminated in the process described in the Shepherd patent, particularly in the case of lenses cast from hydroxyethyl methacrylate (HEMA).

Rawlings in U.S. Pat. No. 4,469,646 attributes the formation of bubbles and voids in the operation of the Shepherd process to the manner in which the two mould halves are brought together. While it is certainly important to control the manner in which the mould is closed, the Rawlings procedure will not ensure that bubbles and voids are prevented and that cast lenses of consistently good quality are produced.

Nevertheless, the manner in which the mould is filled and closed is of some importance. We have found that if the mould halves are brought together too quickly, bubbles are invariably produced, while closure at too slow a speed can cause formation of voids. In addition, we have determined that the mould halves should come together properly aligned to the centre-line of the moulds.

SUMMARY OF THE INVENTION

According to one aspect of the present invention there is provided a process for casting lenses using male and female mould halves formed from a plastics material in which a polymerisable liquid composition is placed in the female mould half, said process comprises inserting the male mould into the female mould until the male mould touches the surface of the liquid composition, allowing the male mould half to fall under its own weight into the female mould half and then pressing the mould halves together and maintaining the resultant closing pressure until the composition has polymerised.

The invention also includes a substantially horizontal support for the female mould, a molder for releasably holding the male mould, means for moving the holder towards and into the female mould along a substantially vertical path passing through the axes of the moulds and means for detecting contact between the male mould and the surface Of the liquid composition and causing said holder to release the male mould.

In the mould closing procedure of the present invention, the male mould continually moves towards the female mould from the moment closure is initiated. This is in contrast to the procedure described by Rawlings in which the mould closure is arrested and preferably reversed when the male mould contacts the surface of the liquid monomer. The speed of approach prior to contacting the liquid monomer surface is immaterial. On the instant of contact with the liquid surface, the male mould is released and falls into the female mould. On being wetted with the monomer, surface tension assists the drawing together of the two moulds which align themselves correctly during this stage.

Contact between the male mould and the liquid can be sensed, e.g. by directing an infra-red beam along the axes of the moulds, and the male mould released at this instant.

In order to produce lenses of consistent quality, it has been found that it is also important to maintain a predetermined pressure on the moulds during the entire period from closing the mould until polymerisation of the monomer composition is complete. In the past this has involved careful control Of the lens closing and polymerisation steps by maintaining the filled moulds in a special jig which is loaded with a predetermined weight. This has been an expensive and laborious procedure.

According to another aspect of the present invention there is provided a process for casting lenses in which a polymerisable liquid monomer composition is filled into a mould comprising male and female mould halves and held in the mould until the monomer composition has polymerised to a solid condition, wherein after introduction of the liquid monomer composition the mould is closed under a predetermined load and the mould halves bonded together (preferably by welding) while under said load. This avoids the need to maintain the mould under a fixed load provided by a weight or spring pressure. Instead, the welds ensure that the mould halves are locked together under the correct degree of compressive load.

Conveniently, the mould halves are boded together by welding in the region of the peripheries of the mould halves.

The mould halves are preferably formed from a thermoplastic polymer, preferably a polyolefin, such as polypropylene, which is readily welded by contact with a heated metal tool. It is unnecessary to weld the mould halves together by a continuous weld line. Indeed, it is preferable to spot weld the rim portions of the mould halves together at spaced locations around the rims of the mould halves.

Preferably the mould filling and closing procedure of this invention is combined with the method of bonding the moulds together under load just described.

One illustrative form of the present invention will now be described in conjunction with the accompanying drawings in which:

DETAILED DESCRIPTION

Figure 1:
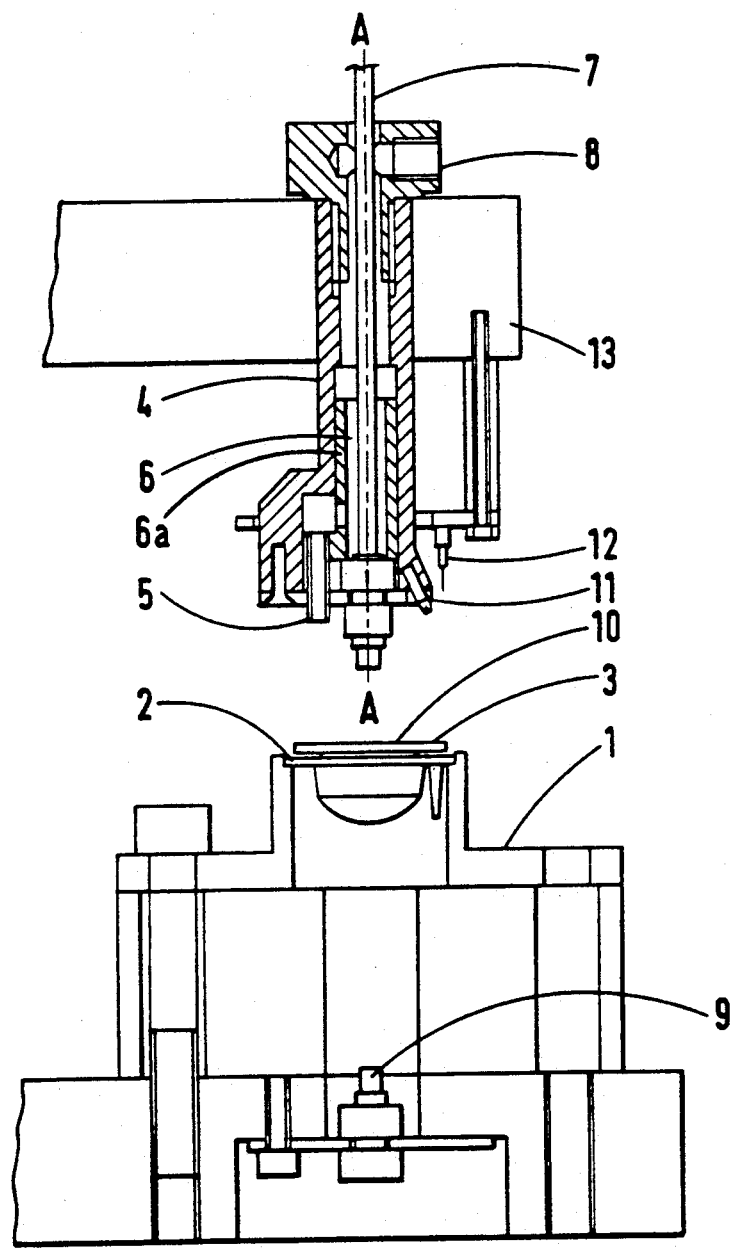
FIG. 1 is a side elevation of the mould filling and closing apparatus.

Referring to the drawings and particularly to Figure 1, the apparatus comprises a table for supporting the female mould half 2. FIG. 1 shows a male mould 3 already received by the female mould from a closure head 4 mounted above table 1. Closure head 4 is arranged to move along axis A—A towards and away from table 1, e.g. by means of an hydraulic ram (not shown) and is provided with vacuum holders 5 (in fact 3 holders are spaced equally around axis A—A) for holding a male mould half. Vacuum is supplied to holders 5 along annular passage 6 between a tube 6a and a coaxial inner tube 7, and through a port 8. A filling tube (not shown) is mounted adjacent to the closure head and arranged to enter the female mould half and introduce a measured amount of liquid polymerisable composition into the female mould using a metering pump. A suitable pump is described in our concurrent patent entitled "Metering Pump" and EP 0195618 (EPA 8630187.9). The filling tube is then moved away and the head 4 moves down towards the female mould along the line A—A carrying the male mould held on vacuum holders 5.

Figure 5:
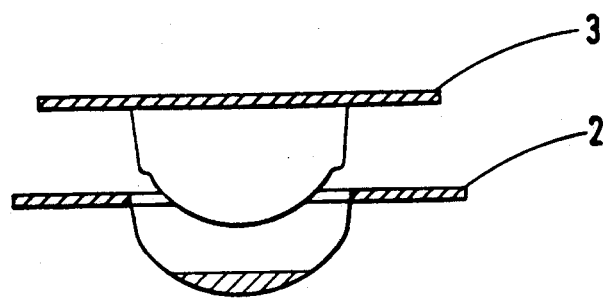
FIGS. 5, 6 and 7 are diagrammatic views of the mould illustrating steps in the filling and closing.

FIG. 5 indicates the movement of the mal mould into the female while the former is supported on the vacuum molders.

Figure 6:
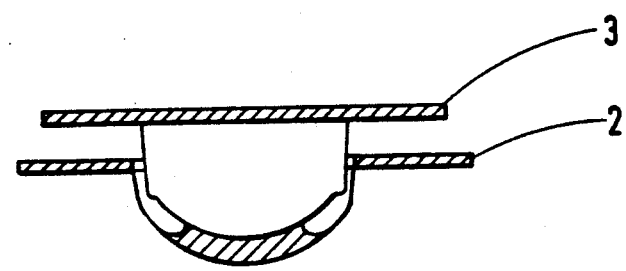

It is important to detect the moment when the tip of the male mould touches the surface of the liquid monomer as illustrated in FIG. 6. This is achieved by directing an infra-red beam through the inner tube 7 along the line A—A, through the appropriate light-transmissive mould halves and onto a fibre optic sensor mounted beneath the table 1 at 9. The sensor gives a sharp response at the moment when the male mould touches the liquid surface and this sharp discontinuity in the response of the sensor is conveniently used as a signal to cause the vacuum supplied to holding tubes 5 to be shut off and thereby cause the male mould to fall into the female mould. It is believed that the reason for this sharp response is that the pool of liquid monomer in the female mould half acts as a positive power lens and focuses radiation from the infra-red source onto the sensor. When the male half touches the surface of the liquid, this 'lens' is destroyed so that there is a sharp reduction in the infra-red radiation falling on the sensor.

This movement is probably effected by a combination of gravity and surface tension and during this movement the male mould is guided by the mating surfaces on the mould halves so that it enters the female mould correctly aligned to the proper axis.

Figure 7:
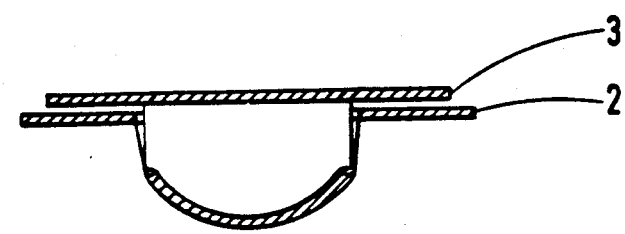

The head 4 follows the downward movement of the male mould until it rests on the upper flange via bearing pins 11. As in the case of the tube 5 there are conveniently 3 bearing pins 11 equispaced around the head 4. The weight of the head 4 provides a predetermined closing pressure applied to the mould halves thus ensuring that the cavity defined by the two mould halves is completely filled with monomer. The situation after the mould halves have been pressed together is illustrated in FIGS. 7 and 8.

Figure 2:
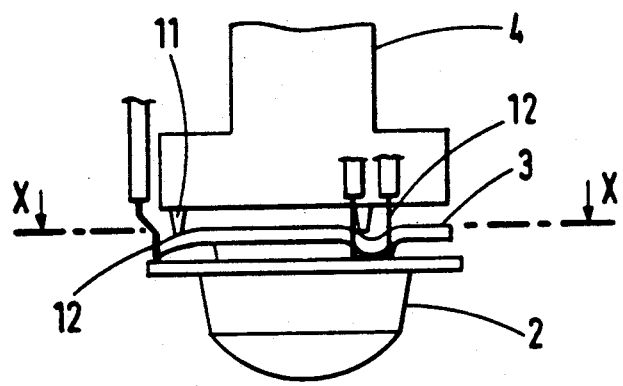
FIG. 2 is a partial side elevation of the mould after closure showing the step of bonding the two mould halves together by welding.
Figure 3:
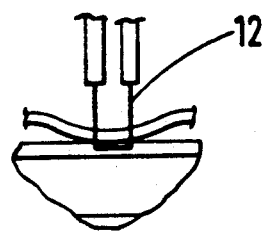
FIG. 3 is a scrap view in elevation showing details of the welding tool and the deflection of the flange of the male (upper mould half) during welding.
Figure 4:
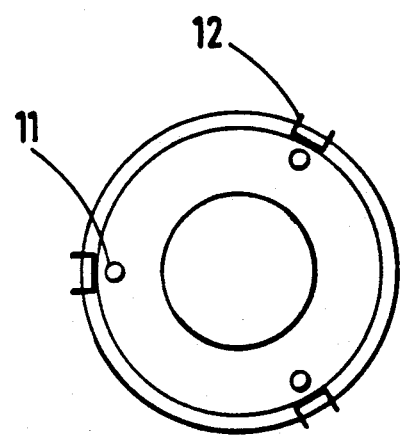
FIG. 4 is a cross-sectional view taken on the line X—X in FIG. 2.

As can be seen from FIGS. 2 and 3, the load applied to the flange 10 through the pins 11 causes deformation of portions of the flange of the male mould downwardly into contact with the corresponding portion of the flange of the female mould 2. At this point, hot wire welding probes 12 are lowered on carriage 13 to weld together the contacting edge portions of the flanges of the male and female mould halves at three or more spaced locations around the mould. The probes 12 are then retracted but the closing pressure is maintained by holding the metal block in place for a few seconds to ensure that the welds are set. Carriage 13 is then retracted and the mould is then moved to a thermostatically controlled environment (e.g. an air circulating Oven Or Water bath) until polymerisation is complete. After the monomer has polymerised to a solid lens, the mould is opened by cutting through the spot welds, opening the mould and removing the lens.

Figure 8:
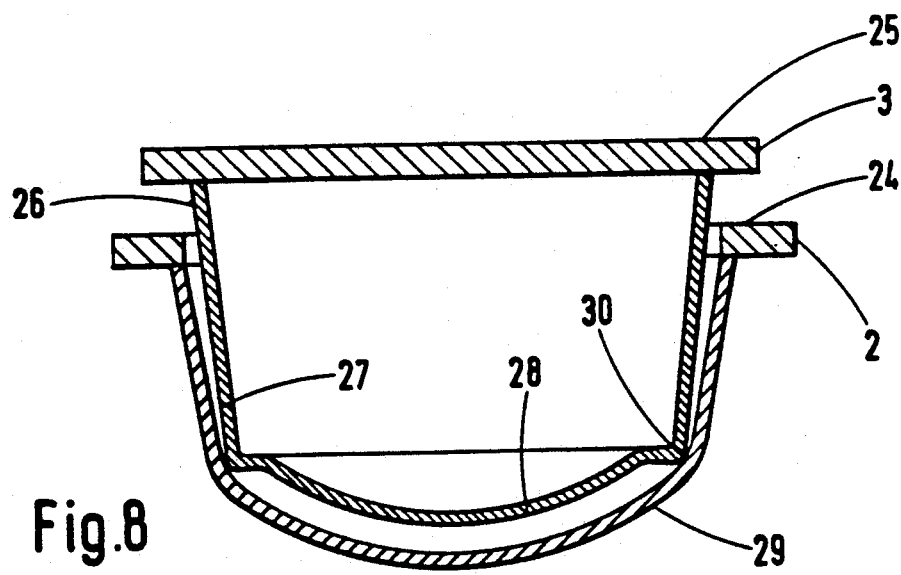
FIG. 8 is an enlarged view of the mould in the fully closed and filled condition of FIG. 7.

Referring to FIG. 8, this shows a mould comprising a female mould half 2 and a male mould half 3 inserted therein in the fully closed condition. The mould halves are made from a stiff thermoplastic polymer such as polypropylene. Each mould half comprises a flange portion 24 and 25 and an integrally moulded hollow body portion 26 and 27. As indicated in the drawing the body portions 26 and 27 have a slight inward taper. In the base areas 28 and 29 of the body portions, the surfaces have a smooth surface corresponding to highly polished surfaces of the master metal moulds of the injection machine on which they are produced.

The curvature of surface 2 determines the base curve of the lens and the curvature of the surface 29 determines the power of the lens. The lens cavity is defined by the space bounded by the surfaces 28 and 29 and a peripheral skirt 30 which is integral with male mould half 3.

It will be appreciated that this invention is not limited to the use of electrically heated welding probes and that other methods of heating can be employed to effect the temporary welding of the two mould halves together. It is even possible to use means other than welding to form the bond between the two mould halves, e.g. hot melt adhesive, although spot welding has practical advantages.

It has been found that by virtue of the accurate alignment of the mould halves achieved by the process of this invention, the profile of the edge of the cast lenses conforms closely to the desired form. As a consequence, lenses can be produced which require little or no edge polishing.

We claim:

1. A process for casting contact lenses comprising:

(a) providing a contact lens mold comprising individual male and female mold halves, finished from a thermoplastic polymer wherein the male mold half forms a formed concave lens surface;

(b) introducing a polymerisable liquid composition into said female mold half;

(c) aligning and guiding the male half into the female half along a substantially vertical center-line axis of the halves;

(d) pressing said male mold half against said female mold half under an external closing pressure to thereby define a closed mold cavity with said liquid monomer;

(e) heat bonding said male and female mold halves together while under the external closing pressure resulting from pressing the male mold half into the female mold half so that the mold cavity remains closed during polymerization;

(f) releasing said closing pressure from said contact lens mold and placing said contact lens mold in a thermostatically controlled environment while said liquid composition therein polymerizes; and (g) when the polymerization is complete, breaking the heat bond, opening said contact lens mold and removing the formed contact lens therefrom.

2. The process of claim 1 wherein said heat bonding step comprises applying hot melt adhesive to said lens mold halves.

3. The process of claim 1 wherein said heat bonding step comprises welding said mold halves together.

4. The process of claim 3 wherein said welding includes applying a plurality of spaced spot welds to said contact lens mold.

5. The process of claim 3 wherein said welding includes using electrically heated welding probe means to weld said mold halves together.

6. The profess of claim 3 wherein said mold halves include flange portions and step (d) is carried out by pressing on the flange portion of the male mold half to deform the flange portion of said male mold half and wherein he flange portions are then welded together.

7. The process of claim 1 wherein said placing step comprises placing said contact lens mold in an air circulating oven.

8. The process of claim 1 wherein said placing step comprises placing said contact lens mold in a water bath.

9. The process of claim 3 wherein the thermoplastic polymer used is polypropylene.

10. A process for casting contact lenses comprising:
(a) providing a contact lens mold comprising individual male and female mole halves, formed form a thermoplastic polymer;

(b) introducing a polymerisable liquid composition into said female mold half;

(c) aligning and guiding the male half into he female half along a substantially vertical center-line axis of the halves;

(d) pressing said male mold half against said female mold half to thereby define a closed mold cavity with said liquid monomer;

(e) heat bonding said male an female mold halves together while under an external closing pressure resulting from pressing the male mold half into the female mold half so that the heat bonding maintains the pressure of closing during polymerization after release of the pressure on the male mold;

(f) releasing said external closing pressure by release o the pressure on the male mold, and placing said contact lens mold in a thermostatically controlled environment while said liquid composition therein polymerizes; and (g) when the polymerization is complete, breaking the heat bond, opening said contact lens mold and removing the formed contact lens therefrom.

* * * * *